March 31, 1925.  1,531,772
R. H. WENTORF ET AL
COOKING VESSEL AND MEANS FOR SECURING THE COVER OF THE VESSEL THEREON
Filed Oct. 4, 1922
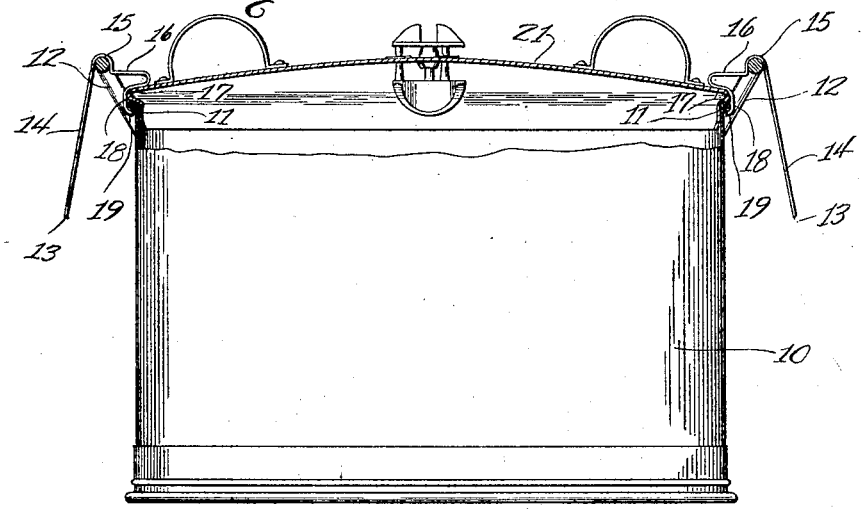
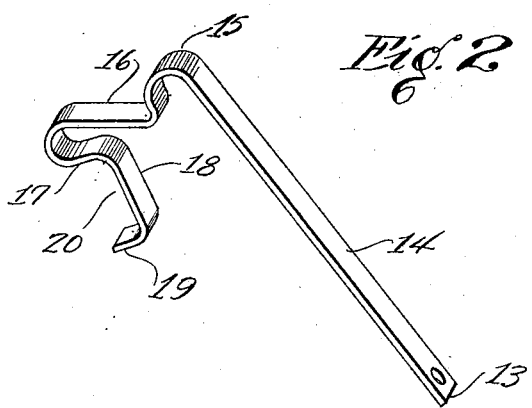
Inventors:
Robert H. Wentorf
and Ernest A. Kerler
By: Sprinkle & Ferris McGair
Attys.
Witness:
J. L. Brown Patented Mar. 31, 1925.

1,531,772

UNITED STATES PATENT OFFICE.

ROBERT H. WENTORF AND ERNEST A. KERLER, OF WEST BEND, WISCONSIN, AS-SIGNORS TO WEST BEND ALUMINUM COMPANY, A CORPORATION OF WISCONSIN.

COOKING VESSEL AND MEANS FOR SECURING THE COVER OF THE VESSEL THEREON.

Application filed October 4, 1922. Serial No. 592,279.

*To all whom it may concern:*

Be it known that we, ROBERT H. WENTORF and ERNEST A. KERLER, both citizens of the United States, residing at West Bend, in the county of Washington and State of Wisconsin, have invented certain new and useful Improvements in Cooking Vessels and Means for Securing the Cover of the Vessel Thereon.

The invention relates to cooking vessels and is more particularly directed to that class of boilers, known as waterless boilers, which have steam tight covers, and has for its primary object the provision of locking means for preventing the cover of the boiler from being forced therefrom by the pressure of steam within the boiler.

A further object of the invention is to provide a device for preventing the forcing of the cover by the steam, that may be utilized for prying the cover from the vessel when it is desired to remove the cover, when the vessel is at a high temperature and is filled with steam or hot water without danger of scalding to the person removing the cover.

In cooking vessels of the character stated, the covers are made to have a steam tight fit and require a prying tool to readily remove them in order to avoid the danger of scalding the person using the boiler.

Other objects of the invention will appear from the description of the preferred embodiment of the invention as set forth in the following specification, reference being had to the accompanying drawings forming a part thereof, the novel features being more particularly set forth in the appended claims.

Fig. 1 is an elevation view partly in section of the improved boiler showing the means for securing the cover thereto.

Fig. 2 is a perspective view of the locking means for securing the cover to the boiler.

Like reference characters designate like parts throughout the drawings.

Reference character 10 designates a boiler having bead 11 formed around the top thereof. 12 designates the handles of the boiler which extend above the plane of the top and outwardly from the sides thereof and upon which the locking device shown in Fig. 2 is fulcrumed. The locking device is formed of a strip of comparatively rigid metal and has lever arm 14, which is looped as at 15, for the reception within the loop of handle 12 and then bent outwardly from, and at an angle of approximately 45 degrees to, lever arm 14, as at 16, and then looped backwardly upon itself as at 17, when the metal is given a downward, or, course, approximately parallel to lever arm 14, as at 18, where it is bent outwardly or in a direction away from lever arm 14, a short distance, as at 19, thus forming a substantially U-shaped jaw 20, in which the edge of cover 21 is adapted to be clamped to bead 11, as clearly shown in Fig. 1. When it is desired to remove the cover from the boiler the locking device is removed from handle 12 and the end of the lever arm 14 inserted under the edge of cover 11 with the lever arm fulcrumed on handle 12, when the outer end of the arm is pressed downwardly prying the cover from the boiler.

It will be seen by reference to Fig. 2 that lever arm 14 will tend to hold the locking jaw 20 in engagement with the edge of the cover 21 and bead 11 by gravity.

In order that the invention might be understood the details of the preferred embodiment have been shown and described, but it is not desired to be limited, except as defined by the scope of the claims, for it will be apparent that persons skilled in the art may resort to various modifications, while at the same time availing themselves of the important features of the invention.

I claim:

1. A locking device for securing the cover to a boiler having a bead around the top thereof, and a handle on the side walls thereof, comprising a lever engageable with the said handle and having at one of its ends a substantially U-shaped jaw.

2. A locking device for a cooking vessel, having a bead around the top thereof, a cover therefor and handles on the side walls of said vessel comprising levers mounted on said handles and having at one of their ends a substantially U-shaped jaw adapted to receive therein the edge of the cover and the bead.

3. A locking device for a boiler, having a cover therefor, a bead around the top thereof, and handles on the side walls thereof, the handles extending above the plane of the top of the boiler and outwardly from the side thereof, comprising a lever arm having at one of its ends a substantially U- shaped jaw, the lever arm being looped intermediate its ends and adapted to receive the handles in the loop.

4. The combination with a cooking vessel of a cover therefor, a plurality of handles secured to the side walls of said vessel, and detachable means engageable with said handles for securing said cover to said vessel or for prying the cover from said vessel.

5. A locking device for a boiler having a cover therefor, a bead around the top thereof, and handles on the side walls thereof, the handles extending above the plane of the top of the boiler and outwardly from the side walls thereof, comprising a lever arm having at one end a substantially U-shaped jaw, the lever arm being adapted to be fulcrumed on the handle to pry the cover from the boiler.

6. A locking device for a boiler having a cover therefor, a bead around the top thereof, and handles on the side walls thereof, the handles extending above the plane of the top of the boiler and outwardly from the side wall thereof, comprising a lever arm having at one end a substantially U-shaped jaw, the lever arm being fulcrumed upon the handle at a point adjacent the jaw, the outer end of the lever arm tending to force the jaw into engagement with the edge of the cover and the bead by gravity.

In testimony whereof I have signed my name to this specification, in the presence of two subscribing witnesses, on this 26th day of September, A. D. 1922.

ROBERT H. WENTORF.
ERNEST A. KERLER.

Witnesses:
WALTER E. MALZAHN,
A. C. RIECKHAFER.